United States Patent
Mecl et al.

(10) Patent No.: US 11,353,369 B2
(45) Date of Patent: Jun. 7, 2022

(54) OPTOELECTRONIC TRANSDUCER MODULE FOR THERMOGRAPHIC TEMPERATURE MEASUREMENTS

(71) Applicant: ACCELOVANT TECHNOLOGIES CORPORATION, North Vancouver (CA)

(72) Inventors: Ondrej Mecl, North Vancouver (CA); Noah John Joe Johnson, North Vancouver (CA); Kevin Matthew Weiss, North Vancouver (CA)

(73) Assignee: Accelovant Technologies Corporation, North Vancouver (CA)

( * ) Notice: Subject to any disclaimer, the term of this patent is extended or adjusted under 35 U.S.C. 154(b) by 0 days.

(21) Appl. No.: 17/515,680

(22) Filed: Nov. 1, 2021

(65) Prior Publication Data
US 2022/0136910 A1    May 5, 2022

Related U.S. Application Data

(60) Provisional application No. 63/110,193, filed on Nov. 5, 2020.

(51) Int. Cl.
*G01K 11/32*    (2021.01)
*G01D 5/26*    (2006.01)

(52) U.S. Cl.
CPC ............ *G01K 11/32* (2013.01); *G01D 5/268* (2013.01)

(58) Field of Classification Search
None
See application file for complete search history.

(56) References Cited

U.S. PATENT DOCUMENTS

| | | |
|---|---|---|
| 4,075,493 A | 2/1978 | Wickersheim |
| 4,215,275 A | 7/1980 | Wickersheim |
| (Continued) | | |

FOREIGN PATENT DOCUMENTS

| | | |
|---|---|---|
| CN | 110146194 A1 | 8/2019 |
| CN | 109632130 | 1/2021 |
| (Continued) | | |

OTHER PUBLICATIONS

Stephen W. Allison et al., Phosphor Thermometry of Gas Turbine Surfaces, International Gas Turbine and Aeroengine Congree and Exposition, Houston, Texas, Jun. 5-8, 1995.
(Continued)

*Primary Examiner* — Brandi N Hopkins
*Assistant Examiner* — Nigel H Plumb

(57) ABSTRACT

Examples of a optoelectronic transducer module with integrated signal processing for use in thermographic temperature measurement are disclosed. The module includes a light source, an optical element to couple the light to an optical port, a connector configured to connect the optoelectronic transducer module to a fiber optic sensor, a detector to detect an emitted light from the fiber optic sensor and convert the detected emitted light into an electrical signal and a module processing unit coupled to the light source and the detector configured to convert the electrical signal into a set of digital results. The optoelectronic module is in communication with an external processing unit using a high speed circuitry for data aggregation and a low speed circuitry for configuration and firmware upgrade in the module. The opto-electronic module is replaceable during operation to avoid big downtime.

17 Claims, 4 Drawing Sheets

(56) References Cited

U.S. PATENT DOCUMENTS

| | | |
|---|---|---|
| 4,448,547 A | 5/1984 | Wickersheim |
| 4,455,741 A | 6/1984 | Kolodner |
| 4,459,044 A | 7/1984 | Alves |
| 4,558,217 A | 12/1985 | Alves |
| 4,652,143 A | 3/1987 | Wickersheim et al. |
| 4,750,139 A | 6/1988 | Dils |
| 4,859,079 A | 8/1989 | Wickersheim et al. |
| 4,980,847 A | 12/1990 | Hirano |
| 4,986,671 A | 1/1991 | Sun et al. |
| 5,036,194 A | 7/1991 | Hazel |
| 5,046,806 A | 9/1991 | Kidder et al. |
| 5,107,445 A | 4/1992 | Jensen et al. |
| 5,183,338 A | 2/1993 | Wickersheim et al. |
| 5,186,046 A | 2/1993 | Gouterman et al. |
| 5,304,809 A | 4/1994 | Wickersheim |
| 5,351,268 A | 9/1994 | Jensen et al. |
| 5,364,186 A | 11/1994 | Wang et al. |
| 5,414,266 A | 5/1995 | Sun |
| 5,695,809 A | 12/1997 | Chadha et al. |
| 5,741,074 A | 4/1998 | Wang et al. |
| 5,775,808 A | 7/1998 | Pan |
| 5,808,407 A | 9/1998 | Chung et al. |
| 5,892,862 A | 4/1999 | Kidder et al. |
| 6,045,259 A | 4/2000 | Djeu |
| 6,243,654 B1 | 6/2001 | Johnson et al. |
| 6,481,886 B1 | 11/2002 | Narendrnath et al. |
| 6,509,126 B1 | 1/2003 | Whitesides et al. |
| 6,667,527 B2 | 12/2003 | Lue et al. |
| 6,721,471 B2 | 4/2004 | MacKinnon |
| 7,326,365 B2 | 2/2008 | Bawendi et al. |
| 7,377,689 B2 | 5/2008 | Balan |
| 7,497,614 B2 | 3/2009 | Gaff et al. |
| 7,507,022 B2 | 3/2009 | Bird |
| 7,548,272 B2 | 6/2009 | Perlman et al. |
| 7,578,616 B2 | 8/2009 | Gaff et al. |
| 7,651,269 B2 | 1/2010 | Comendant |
| 7,651,874 B2 | 1/2010 | Nagel |
| 7,855,632 B1 | 12/2010 | Schuh et al. |
| 7,876,989 B2 | 1/2011 | Aronson et al. |
| 8,046,188 B2 | 10/2011 | Kinugasa et al. |
| 8,123,403 B2 | 2/2012 | Ichida et al. |
| 8,193,726 B2 | 6/2012 | Kinugasa et al. |
| 8,201,997 B1 | 6/2012 | Salour |
| 8,206,030 B1 | 6/2012 | Salour |
| 8,226,769 B2 | 7/2012 | Matyushkin et al. |
| 8,278,114 B2 | 10/2012 | Gambini et al. |
| 8,308,357 B2 | 11/2012 | Kinugasa et al. |
| 8,337,079 B2 | 12/2012 | Kinugasa et al. |
| 8,568,025 B2 | 10/2013 | Meilleur et al. |
| 8,709,592 B2 | 4/2014 | Bird |
| 8,751,188 B2 | 6/2014 | Belak |
| 8,752,434 B2 | 6/2014 | Johansson |
| 8,865,473 B2 | 10/2014 | Gambini et al. |
| 8,995,798 B1 | 3/2015 | Paritsky et al. |
| 9,560,974 B2 | 2/2017 | Tolosa et al. |
| 9,625,923 B2 | 4/2017 | Bohlinger et al. |
| 9,696,217 B2 | 7/2017 | Hockaday |
| 10,444,083 B2 | 10/2019 | Nosrati |
| 10,483,147 B2 | 11/2019 | Nosrati et al. |
| 11,112,356 B2 | 9/2021 | Syvenkyy |
| 2004/0104336 A1 | 6/2004 | Melnyk et al. |
| 2006/0215730 A1 | 9/2006 | Meilleur et al. |
| 2007/0171958 A1 | 7/2007 | Hoang et al. |
| 2007/0237462 A1 | 10/2007 | Aronson et al. |
| 2008/0069180 A1 | 3/2008 | Djeu |
| 2008/0267257 A1 | 10/2008 | Herchen |
| 2009/0129725 A1 | 5/2009 | Durrant et al. |
| 2016/0011060 A1 | 1/2016 | Bergen et al. |
| 2017/0096599 A1 | 4/2017 | Han et al. |
| 2018/0080835 A1 | 3/2018 | Stapleton |
| 2018/0274987 A1 | 9/2018 | Stapleton |
| 2019/0204165 A1 | 7/2019 | Bergen et al. |
| 2019/0314918 A1 | 10/2019 | Margavio et al. |
| 2021/0025819 A1 | 1/2021 | Syvenkyy |
| 2021/0080328 A1 | 3/2021 | Liu et al. |

FOREIGN PATENT DOCUMENTS

| | | |
|---|---|---|
| JP | S62118227 U | 7/1987 |
| JP | S634653 B2 | 1/1988 |
| JP | 2002071473 A | 3/2002 |
| JP | 2008216183 A | 9/2008 |
| JP | 2013108494 A | 6/2013 |
| KR | 20020069934 A | 9/2002 |
| KR | 100387659 B1 | 6/2003 |
| KR | 20100000377 U | 1/2010 |
| KR | 100965105 B1 | 6/2010 |
| WO | 9203836 A1 | 3/1992 |
| WO | 9511461 A1 | 4/1995 |
| WO | 9526498 A1 | 10/1995 |
| WO | 9850767 A1 | 11/1998 |
| WO | 9859015 A1 | 12/1998 |
| WO | 2005043099 A1 | 5/2005 |
| WO | 2007028961 A2 | 3/2007 |
| WO | 2010103999 A1 | 9/2010 |
| WO | 2014007154 A1 | 1/2014 |
| WO | 2016020571 A1 | 2/2016 |
| WO | 2016098586 A1 | 6/2016 |
| WO | 2016098586 A1 | 11/2017 |
| WO | 2021051188 A1 | 3/2021 |
| WO | 2021051204 A1 | 3/2021 |
| WO | 2021102580 A1 | 6/2021 |
| WO | 2021127781 A1 | 7/2021 |
| WO | 2021163794 A1 | 8/2021 |

OTHER PUBLICATIONS

Zeljka Antic et al., Pulsed Laser Deposited Dysprosium-Doped Gadolinium-Vandate Thin Films for Noncontact, Self-Referencing Luminescence Thermometry, Advanced Materials 2016.

J Brubach et al., Characterization of Manganese-Activatd Magnesium Fluorogermanate With Regards To Thermographic Phosphor Thermometry, meas. sci. technol. 19 (2008) 025602(11P).

OPTOELECTRONIC TRANSDUCER MODULE FOR THERMOGRAPHIC TEMPERATURE MEASUREMENTS

TECHNICAL FIELD

The present disclosure generally relates to an optoelectronic transducer module and more particularly to an optoelectronic transducer module with integrated signal processing for thermographic temperature measurements.

BACKGROUND

Unless otherwise indicated herein, the materials described in this section are not prior art to the claims in this application and are not admitted to be prior art by inclusion in this section.

A fiber optic temperature sensor such as a phosphor based sensor is a fiber optic probe that delivers excitation light to a sensing material (e.g., phosphor) and uses luminescence emitted from the phosphor to determine the temperature of an object that is in contact with the sensing material. Typically, thermographic phosphors when excited with light within a certain wavelength range, emit a light within a different wavelength range. Certain characteristics of the emitted light change with temperature including brightness, color, and afterglow duration. The response of the emitted light to temperature is monitored by various methods, such as analyzing the change in emission intensity at a single wavelength range or the change in intensity ratio of two or more wavelength ranges, lifetime decay, or shift in emission wavelength peak. Phosphor used for measuring the temperature of an object is either coated directly on its surface or placed within a probe and brought in contact with the surface, which is then illuminated with a light source and the temperature of the object is determined based on the response of the emitted light.

Standard fiber optic temperature measuring systems known in the prior art comprise a fiber optic probe with an active sensing material at its tip which is connectable to an opto-electronics that process the detected signals and also include calibration data. Usually, a single calibration curve is used for calibrating certain product families of fiber optic sensors which may reduce the sensor's accuracy. Using a calibration curve that individually matches with the sensing elements is not appealing for users since associated opto-electronics are not interchangeable limiting the use of such sensors. Some known sensors, as disclosed in WO2021051204, describe a fiber optic temperature sensor with a calibration data that is stored outside of the optoelectronics housing (positioned either in the fiber optic probe or the connector) such that the same (universal) optoelectronics can be used with different calibration data. Failure of the opto-electronics in fiber optic temperature sensors is often associated with major downtime and costs in manufacturing, especially in the semiconductor industry. Currently in the fiber optic temperature sensing industry there is no opto-electronic conversion module available that is replaceable during operation (hot-swappable) to avoid big downtime. Users cannot replace during instrument operation failed opto-electronic transducers or populate (configure) the number of channels with opto-electronic modules to be used.

Most common failure of the opto-electronic transducer is failure of an excitation light source (LED failure). When the LED fails, the manufacturing process have to be shut down to exchange the failed optoelectronic transducer.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

SUMMARY

Figure 1:
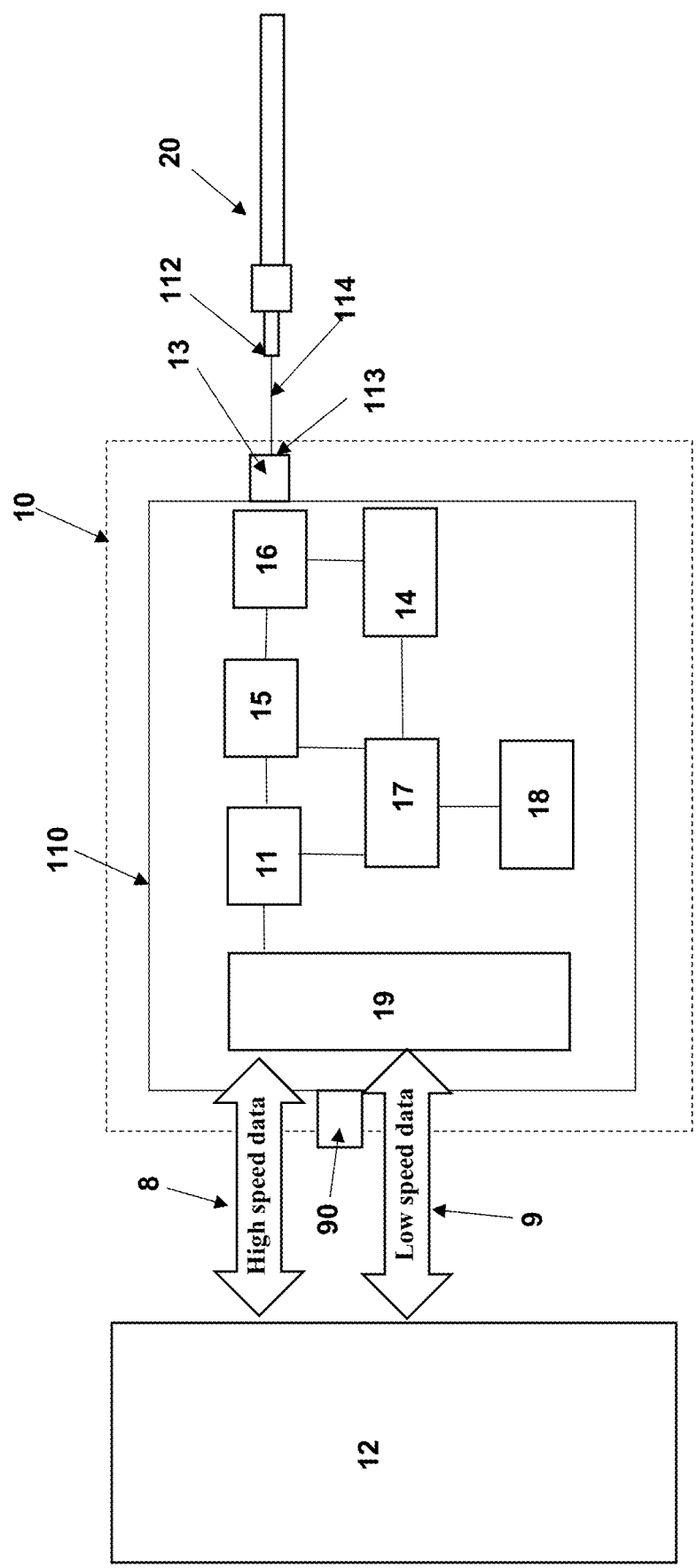
FIG. 1 is a schematic view of an example of an opto-electronic transducer module of the present invention.

In one aspect, optoelectronic standalone transducer module with integrated signal processing for use in thermographic temperature measurement is provided.

The module comprises a housing having a mounting means, a light source to provide an excitation light, an optical element for coupling the light to an optical port, a connector configured to connect the optoelectronic transducer module to a fiber optic sensor, a detector coupled to the optical port to detect an emitted light from the fiber optic sensor and convert the detected emitted light into an electrical signal and a module processor coupled to the light source and the detector configured to convert the electrical signal into a set of digital results. The module processing unit includes a non volatile memory with a configuration and calibration data related to the detector and the fiber optic sensor such that the module processor processes the thermographic temperature measurement taken with the fiber optic sensor. The module further comprises a high-speed circuitry in communication with an external data processing and power supply and conditioning system for data aggregation and a low speed circuitry in communication with the external data processing and power supply and conditioning system for configuration and firmware upgrade in the module. The standalone optoelectronic transducer module is pluggable into a receiving port of the external data processing and power supply and conditioning system such that the standalone optoelectronic transducer module is powered by the external data processing and power supply and conditioning system.

In another aspect, a system for thermographic temperature measurement is provided. The system comprises a data processing and power supply and conditioning system that includes a housing with at least one receiving port, a data processing unit for aggregating data, a communication means for receiving and transmitting data and a power supply and conditioning unit. The system further comprises an optoelectronic standalone transducer module with integrated signal processor for use in thermographic temperature measurement that comprises a housing with a mounting means to plug into at least one receiving port of the data processing and power supply and conditioning system, a light source to provide an excitation light, an optical element for coupling the light to an optical port, a connector configured to connect the optoelectronic transducer module to a fiber optic sensor, a detector coupled to the optical port to detect an emitted light from the fiber optic sensor and convert the detected emitted light into an electrical signal, a module processor coupled to the light source, the detector configured to convert the electrical signal into a set of digital results. The module processor includes a non volatile memory with a configuration and calibration data related to the detector and the fiber optic sensor, so that the module processor processes the thermographic temperature measurement taken with the fiber optic sensor. The system further comprises a high speed circuitry in communication with the data processing and power supply and conditioning system for data aggregation and a low speed circuitry in communication with the data processing and power supply and conditioning system for configuration and firmware upgrade in the module such that the standalone optoelectronic transducer module is pluggable in the receiving port of the data processing and power supply and conditioning system so that the standalone optoelectronic transducer module is powered by the data processing and power supply and conditioning system.

In addition to the aspects and embodiments described above, further aspects and embodiments will become apparent by reference to the drawings and study of the following detailed description.

DETAILED DESCRIPTION OF SPECIFIC EMBODIMENTS

Typically, the opto-electronics transducers usually used in fiber optic temperature measurement system exhibited slower response time compared with high speed control loops they are part of. This is due to combined effects of sensor active material, probe design, interrogation electronics speed and data collection/conversion delays. Usually the opto-electronics transducers used in fiber optic temperature measurement systems are designed with a single processor that performs multiple functions, such as for example interrogation of sensors (analog-to-digital (AD) conversion and signal processing) as well as communicating with external digital systems and converting digital signal to analog values (4-20 mA) for temperature control. Inherent sensitivity of optical measurement, AD conversion and computation combined with non-deterministic nature of digital interface communication imposes limitations of single processor design on response and communication efficiency. The opto-electronics transducer module of the present invention is a standalone optoelectronic transducer module with a dedicated processor for processing the luminescence signal received from the fiber optic sensor and which is pluggable into an external data processing and power supply and conditioning system. The standalone optoelectronic transducer module is powered by the external data processing and power supply and conditioning system such that it can be readily replaced during operation from and in any suitable higher-level data processing system. Such modular configuration of optoelectronic transducer allows for scalable fast measurements, data collection and data transfer.

For the purpose of this application "standalone" shall mean transducer module that contain all hardware, firmware and calibrations necessary to be able to interrogate fiber optic temperature sensor connected to its optical port. It means that it is manufactured as a module and tested/calibrated as a standalone unit with functionality (e.g., measuring luminescent decay) verified and calibrated and thus can be exchanged between the different systems while still retaining all functionality of thermographic temperature measurement with calibration data. For the purpose of this application "pluggable" shall mean that the standalone optoelectronic module can be plugged into a higher-level data processing system by the user. The higher-level data processing systems cannot perform measurement functions without the optoelectronic module(s) being plugged in. The optoelectronic module(s) can be exchanged (plugged/unplugged) by the user without the use of tools. The optoelectronic module contains predefined electrical/communication interface which the external data processing system must adhere to. After plugging the optoelectronic module into the higher-level data processing system, it is initiated and starts its operation.

FIG. 1 illustrates an example of a standalone optoelectronics transducer module 10. The module 10 can be a Small Form-Factor Pluggable (xFOT) module. The modular design allows to swap failed modules 10 without shutting down the manufacturing process. This also allows for user's flexibility in configuring the systems for specific application. The module can be a self-contained interrogator and includes excitation and detection optics and circuitry as well as a calibration and configuration data.

The opto-electronic transducer module 10 is configured so that it integrates signal processing means that are used in thermographic temperature measurement. The module 10 comprises a housing 110 with a mounting means 90, such as plug to be mounted into a channel of any suitable higher-level data processing system. The housing 110 can comprise a light source 14 that provides an excitation light, an optical element 16 to couple the excitation light to an optical port and a detector 15 coupled to the optical element 16 to detect a light emitted from an active material coupled to a tip of a fiber optic probe 20. The light source can be an LED or a lamp that can provide for example an UV light with a wavelength between 200-400 nm or light in the blue to green wavelength range (e.g. 400-600 nm). In one embodiment, the light source 14 can be multiple LEDs as a cluster. In one implementation the light source 14 can comprise two or more light sources (LEDs) that can be redundant excitation sources in case the main LED fails. The optical element 16 can be an optical splitter that couples the excitation light to the optical port. A connector 13 is in communication with the optical port and is configured to connect the optoelectronic transducer module 10 to the fiber optic probe 20. In one embodiment, the light source 14 can be a flip chip LEDs with multiple LEDs in close proximity forming a tight cluster allowing for coupling into the optical port using the same optics (e.g. optical splitter and/or any lenses) as when singular LED is used. In another embodiment, the redundant active elements (LEDs) are optically coupled in the same optical path utilizing cold mirrors and lenses and focused in the same optical port.

In one implementation, the detector 15 can be a photodiode that can convert the optical signal (emitted light) into an electrical signal. The photons absorbed by the photodetector (e.g. photodiode) generate an electrical current. In some embodiments, the electrical signal can be intensified using an amplifier (not shown). A module processing unit 17 is operatively coupled to the light source 14 and the detector 15 and is configured to convert the electrical signal into a set of digital signals/results. In one embodiment, a receiver and power monitor 11 can be used to monitor the intensity of the excitation light and provide data to the processing unit 17 that is configured to switch over to any of the redundant LED when failure of the excitation light source is detected (e.g., if light intensity level degrades and reaches a preset value).

Figure 2:
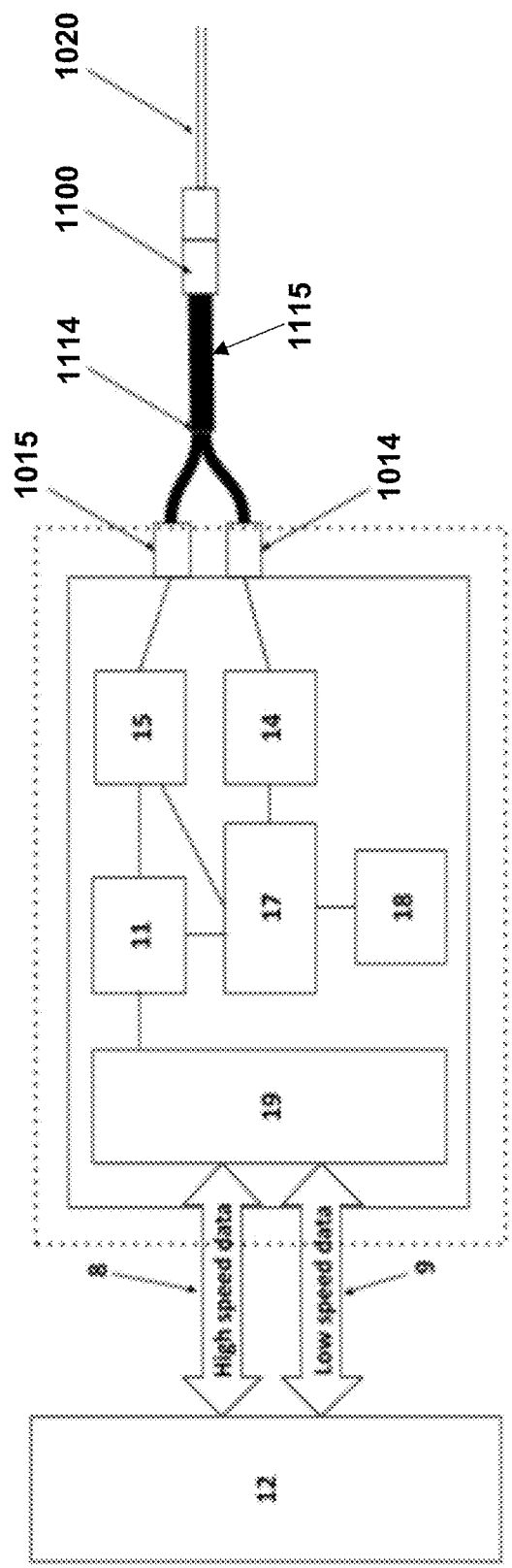
FIG. 2 is a schematic view of another example of an opto-electronic transducer module of the present invention.

The optical element 16 can comprise a collimator lenses and/or cold mirror to split the excitation light and the emitted light. In one embodiment, the optical element 16 can be a fiber optic bundle split to separate the excitation light from the emitted light. In the embodiment shown the FIG. 2, the optical element 16 is replaced by the splitter being formed externally with fiber bundle extension cord/splitter 1114. It can comprise an illumination connector 1014 to couple the light source 14 to the fiber bundle 1115 and a fiber optic probe 1020 and a detection connector 1015 to couple to the detector 15. Thus, the fiber bundle 1115 comprises a first bundle transmitting the excitation light to the active material and a second fiber bundle conveying the emitted light back to the detector 15.

The module processing unit 17 can include a non-volatile memory 18 with a configuration data and calibration data related to the fiber optic probe 20 and the active sensing material. The module 10 further comprises a high-speed circuitry 8 and a low-speed circuitry 9 in communication with an external data processing and power supply and conditioning system 12 in site over a data buffer 19. The high-speed circuitry 8 allows high speed data transfer for data aggregation in the external data processing and power supply and conditioning system 12 while the low-speed circuitry 9 is configured to conduct configuration and firmware upgrade in the module. This configuration of multi-processing architecture for fiber optic temperature measuring systems provides standalone optoelectronic transducer module 10 that can be closely coupled with a sensing medium thus resulting in better sensing signal quality. Each optoelectronic transducer module 10 has a dedicated processor 17 for each individual sensor (probe 20) so that all optical measurement, calculation and conversion of optical to digital data are performed locally in the module 10. Using dedicated high speed data transfer bus 19, the module 10 communicates with the external (dedicated master) data processing and power supply and conditioning system 12 where all data management, power supply and user interface services are performed. The temperature values can be autonomously collected in the external data processing and power supply and conditioning system 12 independently of the measurement. The external data processing and power supply and conditioning system 12 can have a dedicated fast real-time operating system (RTOS) processor that can process data as it comes in real-time without buffer delays and can provide 1) interrogating the module 10 (xFOT)) sensors, 2) provide collected temperature measurements to digital interface devices (EtherCAT, RS-485) and analog interfaces (4-20 mA) and 3) provide system configuration interface for optoelectronic transducer module 10. The optoelectronic transducer module 10 with integrated signal processing can provide improved performance of the fiber optic temperature measuring system including the response time compared to the optoelectronic transducer with single processor, and parallel/distributed approach to computing and data collection and interface handling increases accuracy and response time of large sensor network used for the measurements.

Figure 3:
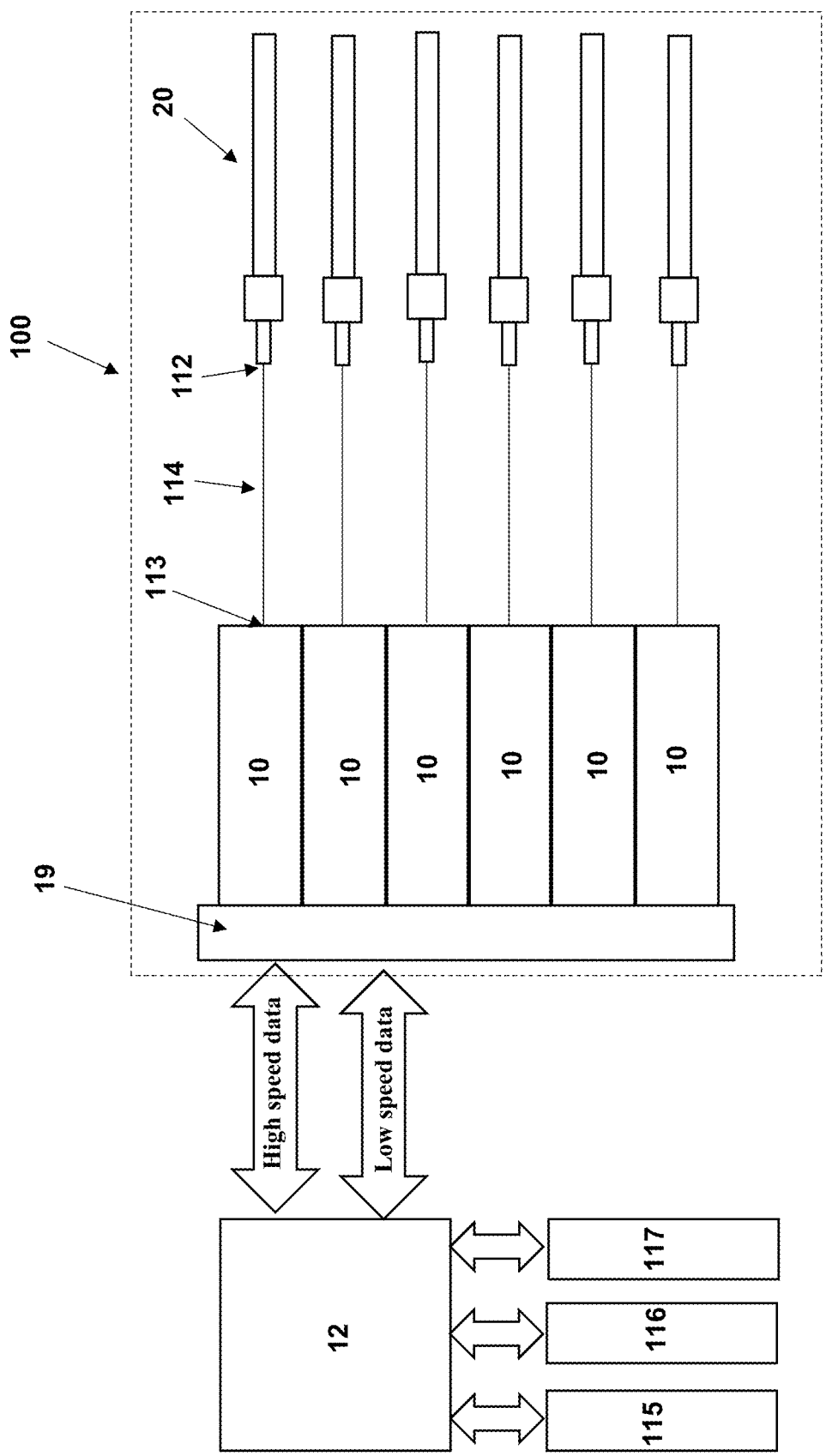
FIG. 3 is a schematic view of an example of an opto-electronic platform with six channels each connected to an individual opto-electronic transducer module.

By moving the power supply, communication interfaces and control devices outside the optoelectronic transducer module 10, it can be scaled to smaller sizes. FIG. 3 illustrates an example of a measurement system with a housing 100 that has at least one receiving port (channel) to connect the at least one optoelectronic transducer module 10 the external (master) data processing and power supply and conditioning system 12. In the illustratable example in FIG. 3 there are 6 channels with 6 modules 10 connected to 6 individual fiber optic probes 20. All 6 modules 10 communicate with the external data processing and power supply and conditioning system 12 using the dedicated high speed data transfer bus 19. The external data processing and power supply and conditioning system 12 can Comprise digital interface devices 115, 116 (i.e., EtherCAT, RS-485) and analog interface devices 117 (4-20 mA) for temperature measurement.

The data processing and power supply and conditioning system 12 can be a proportional integral derivative (PID) controller, an industrial controller, a sensing network distributor, etc., such that the module 10 can be integrated by a third party in the PID controller to minimize response time and latency of the control; or it can be part of the distributed sensing network around a semiconductor tool; or can be integrated in data aggregator for monitoring purposes.

Figure 4:
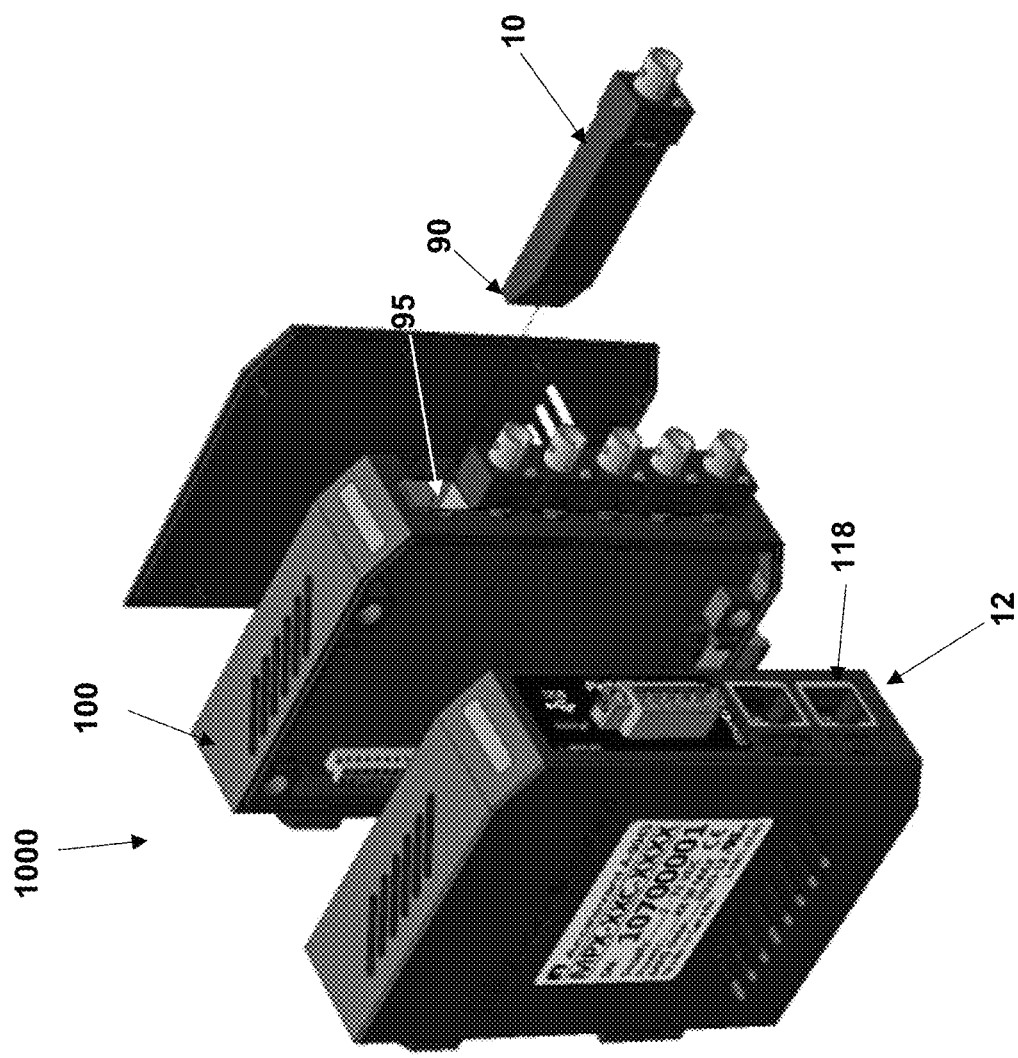
FIG. 4 is a photography example of an opto-electronic platform with multiple channels for opto-electronic transducer modules.

FIG. 4 illustrates a photography example of a measurement system 1000 with 6 channels 95 housing 100 where 6 independent optoelectronic transducer module 10 can be hot-swappable plugged in through a plug-in port. The external data processing and power supply and conditioning system 12 comprises one or more communication interface ports 118 coupled to the processing unit 12.

The fiber optic probe 20 with an active sensing material is connected to each of the modules 10. The active material is positioned near the tip of the probe 20. The probe 20 is functionally coupled to the first end 112 of a fiber or a fiber bundle 114. A second end 113 of the fiber or a fiber bundle 114 is connected to the connector 13 of the opto-electronics transducer module 10.

In one implementation, the active material is a thermographic phosphor which when illuminated with an excitation light emits light in a wavelength different from the excitation light. For example, the excitation light can be UV light with a wavelength between 200-400 nm or light in the blue to green wavelength range (e.g. 400-600 nm). When the active material is illuminated with such excitation light it will emit fluorescence light in the red wavelength range of 600-800 nm. The response of the emitted light to temperature is monitored by various methods, such as analyzing the change in emission intensity at a single wavelength range or the change in intensity ratio of two or more wavelength ranges, lifetime decay, or shift in emission wavelength peak. The fiber or a fiber bundle is configured to transmit the excitation light and the emitted light. In one embodiment, the fiber or a fiber bundle can comprise an excitation light guide (not shown) for transmitting the excitation light to the active material and an emitted light guide (not shown) for transmitting light emitted from the active material.

The opto-electronics transducer module 10 comprises a housing that can be made of a molded plastic or any other suitable material and can have an inner cavity that houses the component of the opto-electronics transducer module 10.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. Optoelectronic standalone transducer module with integrated signal processing for use in thermographic temperature measurement comprising:
    a. a housing having a mounting means;
    b. a light source to provide an excitation light;
    c. an optical element for coupling the light to an optical port;
    d. a connector configured to connect the optoelectronic transducer module to a fiber optic sensor;
    e. a detector coupled to the optical port to detect an emitted light from the fiber optic sensor and convert the detected emitted light into an electrical signal;
    f. a module processor coupled to the light source and the detector configured to convert the electrical signal into a set of digital results, the module processing unit including a non volatile memory with a configuration and calibration data related to the detector and the fiber optic sensor, the module processor processing the thermographic temperature measurement taken with the fiber optic sensor;
    g. a high speed circuitry in communication with an external data processing and power supply and conditioning system for data aggregation; and
    h. a low speed circuitry in communication with the external data processing and power supply and conditioning system for configuration and firmware upgrade in the module,
wherein the standalone optoelectronic transducer module is pluggable into a receiving port of the external data processing and power supply and conditioning system such that the standalone optoelectronic transducer module is powered by the external data processing and power supply and conditioning system.

2. The optoelectronic transducer module of claim 1, wherein the light source is a laser diode.

3. The optoelectronic transducer module of claim 1, wherein the light source is a light emitting diode (LED).

4. The optoelectronic transducer module of claim 1, wherein the light source comprises two or more redundant light sources.

5. The optoelectronic transducer module of claim 4, wherein the light source is a cluster of multiple LEDs.

6. The optoelectronic transducer module of claim 4, further comprising an optical receiver and power monitor coupled to the light source and the module processing unit to monitor an intensity of the excitation light and provide data to the module processing unit to switch over to any of the redundant light sources when failure of the excitation light source is detected.

7. The optoelectronic transducer module of claim 6, further comprising a power optical sensor operatively coupled to the light source to measure and monitor a power output of the light source, the sensor sending input signals to the module processing unit when the power output of the light source reaches a pre-determined value to trigger the at least one redundant light source.

8. The optoelectronic transducer module of claim 1, further comprising a high-speed data transfer bus for communication with the external processing unit.

9. The optoelectronic transducer module of claim 1, further comprising an optoelectronic housing with at least one plug-in channel to detachably plug-in at least one optoelectronic transducer module.

10. A system for thermographic temperature measurement comprising:
    a. a data processing and power supply and conditioning system comprising:
        i. a housing with at least one receiving port;
        ii. a data processing unit for aggregating data;
        iii. a communication means for receiving and transmitting data; and
        iv. a power supply and conditioning unit; and
    b. an optoelectronic standalone transducer module with integrated signal processor for use in thermographic temperature measurement comprising:
        i. a housing having a mounting means to plug into at least one receiving port of the data processing and power supply and conditioning system;
        ii. a light source to provide an excitation light;
        iii. an optical element for coupling the light to an optical port;
        iv. a connector configured to connect the optoelectronic transducer module to a fiber optic sensor;

v. a detector coupled to the optical port to detect an emitted light from the fiber optic sensor and convert the detected emitted light into an electrical signal;

vi. a module processor coupled to the light source and the detector configured to convert the electrical signal into a set of digital results, the module processor including a non volatile memory with a configuration and calibration data related to the detector and the fiber optic sensor, the module processor processing the thermographic temperature measurement taken with the fiber optic sensor;

vii. a high speed circuitry in communication with the data processing and power supply and conditioning system for data aggregation; and viii. a low speed circuitry in communication with the data processing and power supply and conditioning system for configuration and firmware upgrade in the module;

wherein the standalone optoelectronic transducer module is pluggable in the receiving port of the data processing and power supply and conditioning system such that the standalone optoelectronic transducer module is powered by the data processing and power supply and conditioning system.

11. The system of claim 10, wherein the data processing and power supply and conditioning system is an industrial controller.

12. The system of claim 10, wherein the data processing and power supply and conditioning system is a proportional integral derivative (PID) controller.

13. The system of claim 10, wherein the data processing and power supply and conditioning system is a sensing network distributor.

14. The system of claim 10, wherein the light source comprises two or more redundant light sources.

15. The system of claim 14, wherein the light source is a cluster of multiple LEDs.

16. The system of claim 14, further comprising an optical receiver and power monitor coupled to the light source and the module processor to monitor an intensity of the excitation light and provide data to the module processor to switch over to any of the redundant light sources when failure of the excitation light source is detected.

17. The system of claim 16, further comprising a power optical sensor operatively coupled to the light source to measure and monitor a power output of the light source, the sensor sending input signals to the module processor when the power output of the light source reaches a pre-determined value to trigger the at least one redundant light source.

* * * * *